United States Patent
Kubo et al.

[15] 3,675,013
[45] July 4, 1972

[54] IMAGE-CARRYING FILM FOR USE AS AN ORIGINAL FOR PROJECTION AND ITS MANUFACTURING METHOD

[72] Inventors: Keishi Kubo; Kiyoshi Sakai, both of Tokyo, Japan

[73] Assignee: Kabushiki Kaisha Ricoh, Tokyo, Japan

[22] Filed: Nov. 6, 1970

[21] Appl. No.: 87,584

Related U.S. Application Data

[63] Continuation-in-part of Ser. No. 758,668, Sept. 10, 1968, abandoned, and a continuation-in-part of Ser. No. 771,287, Oct. 28, 1968, abandoned, and a continuation-in-part of Ser. No. 805,842, March 10, 1969, abandoned.

[52] U.S. Cl..............................................250/65 T
[51] Int. Cl. ..........................................G01d 15/10
[58] Field of Search..................................250/65 T

[56] References Cited

UNITED STATES PATENTS

| | | |
|---|---|---|
| 2,721,821 | 10/1955 | Hoover................................250/65 X |
| 3,083,132 | 3/1963 | Miehle................................250/65 X |
| 3,111,584 | 11/1963 | Appeldorn............................250/65 |
| 3,223,526 | 12/1965 | Grieshaber et al...................250/65 X |
| 3,480,965 | 11/1969 | Zoppoth et al......................250/65 X |

*Primary Examiner*—William F. Lindquist
*Attorney*—Woodhams, Blanchard and Flynn

[57] ABSTRACT

The invention relates to a diapositive polypropylene film transparency that is self-supporting and dimensionally stable to conditions of storage and use having at least 60 percent of parallel luminous transmittancy to visible light rays at a thickness of 50 $\mu$ or more and a method of its manufacture which comprises placing a transparent undeveloped polypropylene film having a heat-shrinking coefficient less than 15 percent in both biaxial directions in juxtaposition with an infrared absorbing image and transmitting infrared irradiation through the polypropylene film to the original image to create on the film a corresponding light diffusive image comprised of fine undulations of the surface and low light transmittancy, the finished film being useful for projecting said image upon a reflecting screen as a corresponding unilluminated image in contrast to the corresponding transparent portion as an illuminated area.

12 Claims, No Drawings

IMAGE-CARRYING FILM FOR USE AS AN ORIGINAL FOR PROJECTION AND ITS MANUFACTURING METHOD

RELATION TO OTHER CASES

This application is a continuation-in-part of our prior applications Ser. Nos. 758,668, filed Sept. 10, 1968; 771,287, filed Oct. 28, 1968 and 805,842, filed Mar. 10, 1969, all abandoned.

BACKGROUND OF THE INVENTION

The phenomenon of image projection by substantially parallel visible light rays can take a variety of mechanisms, one being the absorbence of light rays by means of an opaque image. This is accomplished by use of light-stopping material such as the precipitated silver of the gelatin-silver film or the use of opaque pigments. It can also be accomplished by a mechanism whereby the light is bent from its parallel path by an image capable of diffusing the light. This produces contrasting light and dark areas on the illuminated screen. In all cases, the absorption or diffusion of the light rays results in the projection of unilluminated areas or shadows on the screen which contrast with the illuminated areas.

Image carrying films are known wherein the image is composed of pigmented areas, chemically eroded areas or otherwise roughened areas, and such films have been proposed and have found use in the field of image projection, where an original image, such as a printed page, chart, or the like, is reproduced on the film so that projection of light through the film onto a light-reflecting screen portrays on the screen the image areas on the original as unilluminated areas contrasting with the illuminated background which corresponds to the background of the original. These films are often of such a nature that the image-carrying element is a layer of insufficient mechanical strength to support itself and thus requires a transparent backing material such as glass, cellulose ester or other plastic. These films are used with the familiar slide projectors or film projectors and are widely used for entertainment or educational purposes.

All prior films used for this purpose suffer from the disadvantages of high cost and complex development procedures, limited storage life, and, in some notable instances, grayness and lack of image definition and contrast owing to derogation of the non-image areas (ideally, transparent) during the prior development processes.

Of these former types, the gelatin-silver halide film is commonly used. As is known, however, these films are characterized by a number of disadvantages which include limited storage life, complex manufacture procedure, including development, fixing, copying and the like.

Films are known that are directly produceable from the original by reproducing the image on a heat-sensitive copying sheet composed of one or more layers, one of which is comprised of a layer element or film of heat shrinkable plastic. Such known processes are undesirable because they involve special penetrant pretreatment of the film prior to image formation, and this pretreatment impairs and reduces the transparency of the entire film, which interferes seriously with any attempt at clear projection on a reflective screen.

The latter kind of film carrying image has heretofore been prepared from transparent thin plastic film that has the usual distinctive character of prior known drawn heat-shrinkable films. According to the prior process, the film is pretreated with a penetrant such as diisooctylates. The films used are copolymers of vinyl chloride and vinyl acetate, for example, and normally shrink to about 0.75 or less of their original lateral dimensions on heating, say, to 120° C.

In U. S. Pat. No. 3,111,584, a thermographic process for making such a transparency is introduced. The process comprises coating a penetrating liquid such as ethyl acetate onto the flat surface of a transparent and highly heat-shrinkable plastic film such as polystyrene film to render the surface cloudy overlaying closely upon an original having infrared absorbing-image areas, and exposing the assembly to infrared rays, whereby the image areas of the original rises in temperature and the areas of the film corresponding to the image areas will microscopically shrink by heating to lower the light transmittancy of visible light rays. However, the remainder (non-image areas) besides the image areas of the resulting transparency has been lowered in light transmittancy to some extent by coating said penetrant. However, the use of the penetrant will unavoidably effect a deterioration in the light transmittancy of the film per se so that the required high contrast will not be obtained. Furthermore, the process involves additional expense, because of the cost of the penetrant and the additional step of the coating.

Similar processes (for instance, U. S. Pat. Nos. 2,721,821, 3,083,132, and 3,223,526) of applying infrared rays to transparent plastic films for the purpose of preparing such positive projection transparencies or printed plastics are also known. However, these processes have also the substantially same disadvantages as described above and do not produce a clear-cut image.

When such a pretreated heat-shrinkable film is laid upon the original and the assembly is exposed to infrared radiation through the film, the local areas corresponding to the original image rise in temperature and shrink, and become diffusive to parallel visible light rays. Such a developed film is hence useful as a diapositive film, and can be used for image projection. However, the penetrant pretreatment so impairs the transparency of the overall film that the non-image areas fail to transmit sufficient visible light to afford a sufficient contrast of brightened background. It has hence been suggested that the distorted or sunken areas of the image on such a film be pigmented for contrast.

When such heat-shrinkable films are used without the penetrant pretreatment, the image areas shrink excessively on infrared exposure, and cracks and pinholes result. Such films must be inked to cover the blemishes and pinholes.

Prior films are hence not dimensionally stable when subjected to heat during the developing process or subsequent storage and use.

Heat responsive plastic coatings or film have been used to remove and hold (as a transparency) or to transfer the ink from a printed page or the like onto the film, thus completely destroying the original image.

SUMMARY OF THE INVENTION

The present invention provides and image-carrying self-supporting film for use as a diapositive film for projection of the image by transmitted substantially parallel light rays of the visible spectrum, contrasting with non-transmitted diffused light of the image.

We have found that satisfactory contrast is obtained only when the film has a minimum of 60 percent transparency, i.e., parallel luminous transmittance in the visible range of light. This property is referred to also as "transparency" in this application and is measured by ASTM 0 1003–52.

Satisfactory non-transmittance, i.e., stoppage of parallel luminous tranamittance is achieved, in accordance with this invention, through diffusion which is accomplished by creating on the transparent film a light-diffusive image composed of an area which is characterized by being composed of fine undulations of the film surface, and the image area is further characterized by the substantial absence of such blemishes as cracks, breaks or pinholes in the film.

As above-noted, the use of heat-shrinkable films has heretofore required the use of penetrants which seriously diminishes their transparency. The use of ordinary heat-shrinkable films such as polypropylene without penetrant pretreatment results in the formation of cracks, disrupted areas, and pinholes on exposure to infrared development.

We have discovered that the use of transparent polypropylene film having a critically modified shrinking characteristic as a starting undeveloped film for infrared development, or in fact, any transparent film having these heat-shrinking properties and also having the thermal property of being rendered light diffusively opaque when exposed to heat results in a satisfactory diapositive film so long as the parallel luminous transmittance in the nonimage areas can be maintained at a value of at least 60 percent. This value will be hereafter referred to as the film's "transparency."

Since the apparent opacity in the image areas of the films of this invention is based upon thermal change, and the physical character of the opaque or light diffusive image areas that result is characterized by a surface composed of fine surface undulations, we have concluded that the physical change is one related to melting and shrinking during the infrared developing process.

The object of the present invention is to provide a positive projection transparency capable of forming a clear-cut image corresponding to an original image on a screen when projected.

The positive projection film according to the present invention consists essentially of polypropylene film having at least 60 percent of parallel luminous transmittancy to visible light rays in a film having a thickness of 50 $\mu$ and having a heat-shrinking coefficient less than 15 percent in both of biaxial directions on heating at 120° C. for 1 minute, one surface of said film having image areas defined by fine undulations of the surface of the polypropylene film and low light transmittancy, the remainder of the film having a high light transmittancy, and both the image areas and the remainder of the film being not coated with any infrared-absorbing materials such as printing ink, whereby the projection of light through the film onto a screen will form on the screen a dark visible image corresponding to said image areas and a bright background.

Such transparency is made by overlaying a colorless or colored polypropylene film in close contact on an image-carrying original, said film having at leas 60 percent of parallel luminous transmittancy to visible light rays, in the wave length ranges 400 to 700 nm, in a thickness of 50 $\mu$ and more and having a heat-shrinking coefficient less than 15 percent in one biaxial direction as well as the other biaxial direction on heating at 120° C. for 1 minute, exposing the assembly from the film side to infrared rays, whose wave length ranges 500 to 3500 nm, for a short while, thereby forming in the area of the film in contact with the original image an image consisting of fine undulations. The exposure of the assembly to infrared rays is usually conducted by moving the assembly at a rate of 1-10 cm/sec. This can be done by the known slit exposure technique. The heat-shrinking coefficient occurring herein is determined by ASTM D-1204-54.

In the present invention, a colored polypropylene film as well as colorless polypropylene film, both physical properties being specified above, may be employed. The colored polypropylene film will absorb however several wave lengths inherent thereto. Accordingly, when the colored polypropylene film is used, a parallel luminous transmittancy is herein shown as the maximum value of the values, which are varied with said wave lengths inherent to the color of the film, determined for the film. For example, when the color of the film is green, the maximum value thereof within the range of the wave length of visible light rays appears at about 500 nm where the parallel luminous transmittancy of the film according to the present invention should not be less than 60 percent.

Thus, in the present invention either a drawn or undrawn polypropylene film having more than 60 percent of parallel luminous transmittancy may be used. If a drawn polypropylene film having a heat-skrinkability of more than 15 percent in both or either of the biaxial directions on heating at 120° C. for 1 minute, however, is used as a film for making a positive projection transparency, the film will give pinholes by excessive heat-shrinking in the areas corresponding to the original image. As the pinholes allow transmission of light, a clear-cut image cannot be projected on a screen when such a pinhole-carrying film is employed.

It has now been found that positive projection transparencies, which produce a clear-cut and high contrast image on a screen, may be provided by using a transparent polypropylene film having a relatively low heat-shrinkability less than 15 percent in both of biaxial directions on heating at 120° C. for 1 minute.

The polypropylene film to be employed for the present invention may be prepared by any method of casting, uniaxial or biaxial drawing, etc. and no limit is placed on thickness of the film used for making a transparency, but it is preferably in the range of 10-150 $\mu$. We prefer to use film having at least a 60 percent transparency at a thickness of 50 $\mu$.

Polypropylene film, otherwise meeting the physical requirements described above, fully satisfies the conditions required for a diapositive film for use in projection and especially the resolution of the diapositive film for use in projection expressed in terms of discernible line separation per unit length. This value is consistently, according to this invention, about 2.2 lines/mm. or more, which is an excellent resolution.

We have discovered that undrawn or cast polypropylene film exhibits superior properties, being sufficiently heat sensitive to form on the surface of the sheet or film an image that is highly light diffusive and consequently of low transmittance, said image consisting of an aggregation of fine undulations of the surface of the sheet or film and being capable of producing a clear projected image of high resolvability. These films, even the ordinarily available ones, have a parallel luminous transmittance (transparency) of 80 percent or more, and the resulting diapositive film hence has high contrast.

The undrawn films which can be used in this invention are substantially free of the phenomenon of cracking, perforation or pinhole formation on exposure to infrared heating, and those films having a heat-shrinking ration of 2 percent or less at 120° C. for 1 minute are preferred and have proven to be completely free of pinholing. These films are particularly useful for faithful reproduction of original images even where the original images consist of a complicated combination of thick lines and fine lines, as occur, for example in characters or pictures written or drawn with a brush. The superior heat sensitivity of these undrawn polypropylene films offers the further advantage of development or image formation at a rapid rate; a faithful reproduction of any desired image can be accomplished by infrared irradiation for a very short period of time, usually in the range of 2 to 5 seconds.

The image carrying films of this invention have the further advantage of being substantially dimensionally stable throughout the process of preparation.

In addition, commercially available drawn polypropylene film has usually a heat-shrinking coefficient of 10-50 percent in both of biaxial directions. In order to modify such a polypropylene film to one having no more than 15 percent of a heat-shrinkage it can be process by the following method (i.e. heat-treatment), that is:

1. Passing the commercial drawn polypropylene film over a series of heated metal rolls with a contact time at 60° to 120° C. for 10 to 40 seconds. The first contact temperature is about 60° C., i.e. the first roll, for example; and the temperature of the rolls in the series is increased in sequence to the last roll which has a temperature of about 120° C.

2. Winding the commercial drawn polypropylene film in multiple layers around a metal bobbin and keeping the wound bobbin at 80° to 90° C. for 2 or 3 days. This can be done by oven-heating or by placing it in a hot water bath.

This heat treated polypropylene has advantages over cast or unstretched polypropylene film; i.e., higher tensile strength and impact strength, lower haze value (as shown in the following table), higher transparency for visible light, and lower cost per unit area of film.

Table

|  | Stretched polypropylene | Cast (unstretched) polypropylene |
|---|---|---|
| tensile strength |  |  |
| lengthwise (psi) | 26,000 | 5,700 |
|  | 22,000 | 3,200 |
| impact strength 18-22° C. (cm.kg/mm) | 250-350 | 100-150 |
| 3-5°C. | 180-290 | 10 |
| haze value (%) | 0.5-1.5 | 0.5-3.5 |

In using the undrawn film or the film that is drawn with heat-shrinking percentages within the limits specified above, the following examples illustrate the steps of placing such a film of transparent polypropylene film having a transparency of at least 60 percent onto the image-bearing surface of an original carrying an image to be reproduced so as to establish substantial surface-to-surface direct contact between said image-bearing surface and one surface of said film, exposing the resulting assembly of the original and the film to infrared light directed through the other surface of the polypropylene film until there is formed on said one surface of the polypropylene film light diffusive image areas of low light transmittancy corresponding to said image on the original and the remainder of the film has a transparency of at least 60 percent, said image areas consisting of fine undulations of said one surface layer of the polypropylene film.

A positive projection transparency according to this invention exhibits a great difference in the manner of transmission of parallel light rays between the image areas and the non-image areas. On close analysis, it is to be seen that in the non-image areas most of the parallel light rays enter and pass straight through the film; however, in the image areas most of the parallel light rays entering the film are diffused when passing through the aforementioned fine undulations. Thus, the quantity of light transmitted through the image areas as parallel light rays is much smaller than that transmitted through the non-image areas. To cite an example, a positive projection transparency prepared according to the invention by exposing a polypropylene film having a light transmittancy of 90 percent to visible rays and having a heat-shrinking coefficient of 2 percent in both of biaxial directions according to the prescribed method results in light transmittancy in the non-image areas of approximately 90 percent, while in the image areas the light transmittancy is reduced to 20 percent.

piece of newsprint, and the assembly was exposed by slit exposure to infrared rays by using an infrared lamp (having a color temperature of approximately 2,800° K.) for copying onto a heat sensitive paper from the film side at a distance of 10 mm and at a rate of 3.0 cm/sec.

The transparency thus obtained for use in projection showed a luminous transmittancy of 18 percent in the image areas and 90 percent in the non-image areas, and its resolution was 2.5 lines/mm. The transparency accordingly produced a distinctly clear projection image on a very bright background by means of an overhead projector. The aforementioned film, irrespective of whether it is exposed to infrared rays or not, has almost unlimited storage life, and the transparency for use in projection showed no change at all even after prolonged use in the projector.

For comparison, a low density colorless polyethylene film (trade name: Sumikasen, made by Sumitomo Chemical Industry Co. Ltd.) having a parallel luminous transmittancy of 83 percent and a heat-shrinking coefficient of 0 percent in one direction and 0.6 percent in another direction on heating at 120° C. for 1 minute was subjected to the same processing as in this Example excepting that the exposure rate was changed to 5.0 cm/sec. The resultant comparative projection transparency had a light transmittancy of about 83 percent in the non-image areas and 65.5 percent in the image areas thereof and a resolution power of 1.10 lines/mm. This illustrates that the properties of contrast and clearness, of the comparative transparency are inferior to those of the transparency according to the present invention.

For another comparison, a positive projection transparency sample was prepared by the method described in this Example, using a colorless polystyrene film (trade name: Santoclear, made by Mitsubishi Monsanto Co. Ltd.) having a light transmittancy of 89 percent and a heat-shrinking percentage of 44 percent in one axial direction and 48 percent in another axial direction, in lieu of the colorless polypropylene film of the example. The polystyrene transparency had a light transmittancy of about 89 percent in the non-image areas and 76 percent in the image-areas thereof and a resolution power of 1.58 lines/mm. This illustrates that the properties of the polystyrene sample is, as a positive projection transparency, inferior to that of the polypropylene sample according to the present invention.

In this example, the exposure rates were varied in the range of 2.1 to 8.0 cm/sec. The results are as listed in the following table in which the values enclosed with dotted lines represent the optimum results.

| Exposure rate | Polypropylene film | | | | Polyethylene film | | | | Polystyrene film | | | |
|---|---|---|---|---|---|---|---|---|---|---|---|---|
|  | I (percent) | N (percent) | C (percent) | R (lines/mm.) | I (percent) | N (percent) | C (percent) | R (lines/mm.) | I (percent) | N (percent) | C (percent) | R (lines/mm.) |
| 2.1 | 15.8 | 88.4 | 72.6 | 0.95 | 28.5 | 35.1 | 6.6 | | 66.7 | 87.4 | 20.7 | 0.95 |
| 2.5 | 20.2 | 89.0 | 68.8 | 1.34 | 36.6 | 58.5 | 21.9 | | 67.3 | 88.3 | 21.0 | 0.95 |
| 3.0 | 26.8 | 88.6 | 61.8 | 1.89 | 47.2 | 82.4 | 35.2 | 0.55 | 76.0 | 89.2 | 13.2 | 1.58 |
| 3.5 | 35.1 | 88.5 | 53.4 | 1.34 | 52.8 | 82.4 | 29.6 | 0.67 | 78.1 | 89.0 | 10.9 | 0.79 |
| 4.0 | 47.2 | 88.3 | 41.1 | 0.95 | 57.4 | 83.6 | 26.2 | 0.67 | 86.4 | 89.3 | 2.9 | 0.55 |
| 4.5 | 74.2 | 88.3 | 14.1 | 0.47 | 61.7 | 83.1 | 21.4 | 0.78 | 89.4 | 87.3 | | |
| 5.0 | 82.9 | 89.0 | 6.1 | | 65.5 | 83.0 | 17.5 | 1.10 | 90.4 | 90.0 | | |
| 6.0 | 88.1 | 88.6 | 0.5 | | 66.3 | 83.5 | 17.2 | 0.67 | 88.5 | 89.7 | | |
| 7.0 | 89.7 | 86.9 | | | 71.9 | 83.2 | 11.8 | 0.47 | 89.6 | 87.6 | | |
| 8.0 | 89.1 | 87.5 | | | 76.8 | 83.4 | | | 89.7 | 89.0 | | |

NOTE.—I = Parallel luminous transmittancy in the image areas; N = Parallel luminous transmittancy in the non-image areas; C = Contrast of the projection transparency, derived from the formula C = N − I; R = Resolution power in the image areas of the transparency.

DESCRIPTION OF THE PREFERRED EMBODIMENTS

Example 1

Cast colorless polypropylene film having a thickness of 35 μ (trade name: "Toh-Cello" CPP–S No. 35; parallel luminous transmittancy, 90 percent, sold by Tohcello Shoji Kaisha Ltd.) and having a heat-shrinking coefficient of 0.2 percent in one axial direction and 0.6 percent in the other axial direction at 120° C. for 1 minute was cut into a convenient size, laid on a As shown in the table, both the contrast and the clearness of the polypropylene transparency is superior to that of the other transparencies.

Next, the polypropylene film used for making the transparency of Example 1 was dipped into toluene for 5 hours at 30° C. and no appreciable changes on the film surface were detected. The treated polypropylene film was subjected to the same processing as in this example. The properties of the resulting polypropylene were as substantially same as in that of the untreated polypropylene mentioned above.

Example 2

A colorless polypropylene film having a thickness of 22 $\mu$ and a heat-shrinking coefficient of 1.8 percent in one axial direction and 4.0 percent in the other axial direction, manufactured according to the unbalance-biaxial drawing method (trade name: SAN-ORIENT, parallel luminous transmittancy; 91 percent, manufactured by Sansho Resin Co., Ltd.) was exposed to infrared rays in the same way as mentioned in Example 1. On the film thus exposed to infrared rays, an opaque hazy image was formed quite identical with the image printed on the newspaper. When the image-carrying areas of the film were examined microscopically, very fine wrinkles were observed on the surface of the film. When the film was used to project the image on a screen, a satisfactorily clear dark image was produced in contrast to a very bright background.

Example 3

A piece of one axially stretched colorless film having a thickness of 30 $\mu$, a luminous transmittancy of 89 percent and a heat-shrinking coefficient of 0.1 percent in one axial direction and 7.0 percent in the other axial direction (trade name: Mitsui "Noblen" film ASY No. 30, manufactured by Mitsui Chemical Industry Co., Ltd.) was treated with infrared rays in the same way as mentioned in Example 1. A positive transparency for use in projection thus obtained showed a luminous transmittancy of 22 percent in its image-carrying areas and 89 percent in its non-image areas, and its resolution was 2.2 lines/mm. When the transparency was used to project an image on a screen or white wall, a distinct dark image was produced on a bright background.

In this case, the light-transmittancy in the image areas was varied with the exposure rate to infrared rays as follows:

In this case, the light-transmittancy in the image areas was varied with the exposure rate to infrared rays as follows:

| Exposure Rate (cm/sec) | I (%) |
| --- | --- |
| 2.1 | 17.2 |
| 2.5* | 25.4** |
| 3.0* | 28.8** |
| 3.5 | 46.4 |
| 4.0 | 57.1 |
| 4.5 | 83.4 |
| 5.0 | 89.4 |
| 6.0 | 89.6 |
| 7.0 | 90.0 |
| 8.0 | 89.5 |

Remarks:
I: Parallel luminous transmittancy in the image areas thereof.
*Optimum condition
**Optimum result Example 4

A drawn colorless polypropylene film (trade name: TORAYFAN BO-2400, sold by Toyo Rayon Co., Ltd.) having a thickness of 15 $\mu$, a parallel luminous transmittancy of 89 percent and a heat-shrinking coefficient of about 40 percent of initial dimension of the film in both of biaxial directions on heating at 120° C. for 1 minute, was given a heat-shrinking control treatment by the method of the aforementioned heat-treatment (1) so that its heat-shrinking coefficient was adjusted so as to be less than 2 percent in both directions. Polypropylene film thus obtained was cut into the size of 8.2 × 11.7 inch, and the cut film was laid upon a newspaper, holding it firmly between the silk screen carrier and the newspaper, and then exposed to infrared rays in such a manner as Example 1 exceptinG that the exposure rate was 10 cm/sec. Thus, the positive projection transparency (which carries a desired image corresponding to the image of the newspaper) was obtained, which was the substantially same properties as in Example 1.

Example 5

A drawn colorless polypropylene film (trade name: POLYSET, sold by Kokoku Jinken Pulp Co., Ltd.) having a thickness of 40 $\mu$, a luminous transmittancy of 80 percent and a heat-shrinking coefficient of 25 percent and 38 percent in respective biaxial directions, was given a heat-shrinking control treatment by the method of the aforementioned heat-treatment (2) (with a hot water bath) so that its heat-shrinking percentage was adjusted so as to be less than 3 percent in both biaxial directions. The transparency for projection obtained by using said treated film in the same procedure as that described in Example 1, excepting that the exposure rate was 1 cm/sec., had a parallel luminous transmittancy of about 80 percent in the non-image areas and 11 percent in the image areas thereof.

Example 6

A polypropylene resin (sold by Mitsui Chemical Industries Co., Ltd. under the trade name of NOBLEN RESIN) was extruded through the T-shaped die to form a film having a thickness of about 0.1 mm. Said extrusion was carried out under the following conditions.

| | |
| --- | --- |
| Temperature of cylinder | |
| rear part | 200° C. |
| front part | 250° C. |
| Temperature of die | 250° C. |
| Winding speed | 70 m/min. |
| Cooling temperature | 20° C. |

The polypropylene film thus obtained has a heat-shrinking percentage of 0 percent in one direction (crosswise), and 12 percent in another direction (lengthwise) and a luminous transmittancy of 87 percent.

Said polypropylene film was exposed to infrared rays in the same procedure as that described in Example 1.

The positive transparency thus obtained had a parallel luminous transmittancy of about 87 percent in the non-image areas and 17 percent in the image areas thereof.

Example 7

In Example 3, a piece of biaxially stretched colorless polypropylene film having 15 percent of a heat-shrinking coefficient in both biaxial directions was used. The properties of the resulting transparency was substantially the same as in the preceding Examples. On the contrary, a piece of biaxially stretched polypropylene film having 20 percent of a heat-shrinking coefficient in both directions was considerably perforated in the corresponding areas of the film to the original image so that, when projected, a uniformly dark image could not be produced on the screen.

Example 8

One Kg of polypropylene resin (sold by Mitsui Chemical Industries Co. Ltd. under the tradename of NOBLEN RESIN) was melted, then Chrome Yellow R (a color pigment) consisting of $PbCrO_4$ 5g was added thereto; and the composition was extruded at 210° C. through a T-shaped die to form a colored polypropylene film havinG a thickness of about 50 $\mu$. The colored polypropylene film has a parallel luminous transmittancy of 70 percent (maximum Value) against visible light rays and a heat-shrinking coefficients of 0.1 percent in one direction and 0.3 percent in another direction at 120° C. for 1 minute. The colored polypropylene film was subjected to the processing described in Example 1. The resulting positive projection transparency has a maximum parallel luminous transmittancy of about 70 percent in the non-image areas and 25 percent in the image areas thereof and a resolution power of 1.8 lines/mm. Thus, when the transparency was projected on a screen, a clear-cut black image of high contrast was produced on a yellow background.

Example 9

In Example 8, Ultramarine Blue in lieu of Chrome Yellow R was used. The so obtained colored polypropylene has a color parallel luminous transmittancy of 60 percent (maximum value), and the resulting projection transparency has a maximum light transmittancy of about 60 percent in the non-image areas and 21 percent in the image areas thereof and a resolution of 1.8 lines/mm. Thus, when projected on a screen, a clearcut black image of high contrast was obtained on a blue background.

Example 10

On an undrawn transparent polypropylene sheet having the thickness of 20 μ (sold by Tohcello Shoji Kaisha, Ltd. of Japan under the tradename of TOHCELLO Polypropylene Film No.20, this film being molded by the casting method) and cut to a size of 8.2 × 11.7 inches, was placed a sheet of newspaper of the same size, and they were held firmly together on a silk screen carrier. Then, a so-called slit exposure was performed on the resulting assembly of the sheet and the newspaper by irradiating infrared light thereon at the side of the polypropylene sheet not carrying the newspaper thereon by the use of a copying machine which was provided with an infrared lamp thereinside (tradename: Thermo-Fax Copying Machine Model No. 47 made by Sumitomo–3 M, Ltd. of Japan) while sliding the silk screen carrier at a speed of 4.5 cm/second (the velocity of the copying machine being set at 2.5 on the speed graduations provided thereon). Thus, an image-carrying film for use as an original for projection was prepared. On microscopic examination of the image region of this film, it was noted that this image region was comprised of extremely fine ridges and recesses of the film material.

The image carried on the film thus obtained was demonstrated to be light diffusive by being then projected on a screen to form an enlarged projected image thereon by the use of a projector (view-scope). The result was that a clear image consisting of black (unilluminated) characters was projected on a very bright background on the screen. The projected image was viewed at the distance of 20 m from the screen, and the image was very clear.

It will be noted that the transparency film after completion of infrared development according to this invention does not bear any ink, pigment or other externally applied coloring material. The film is devoid of pinholes, cracks or the like discontinuities. Moreover, the non-image area possesses a transparency of at least 60 percent and is substantially unaltered as regards its transparency and smoothness from its condition prior to infrared development. The image areas are characterized by a surface composed of fine undulations which are light diffusive.

We claim:

1. The method of making a diapositive image bearing polypropylene film comprising exposing an undeveloped polypropylene film of the group consisting of (1) undrawn, (2) cast, (3) biaxially drawn with a heat-shrinking percentage of less than 15 percent in either biaxial direction, (4) monoaxially drawn with a heat-shrinking percentage of less than 15 percent in the drawn axial direction; said polypropylene film having a transparency of at least 60 percent, to image developing infrared irradiation in the absence of a penetrant, said irradiation being sufficient to create an image composed solely of fine surface undulations.

2. The method of claim 1 in which the image developing infrared irradiation is achieved by placing the undeveloped film in juxtaposition with an infrared absorbing original image and transmitting the infrared irradiation through the polypropylene film to the original image.

3. The method of claim 1 in which the undeveloped polypropylene film is cast polypropylene film.

4. The method of claim 1 in which the undeveloped polypropylene film is undrawn polypropylene film.

5. The method of claim 1 in which the undeveloped polypropylene film is biaxially drawn polypropylene film having a shrinking percentage of less that 15 percent in either biaxial direction.

6. The method of claim 1 in which the undeveloped polypropylene film is monoaxially drawn polypropylene film having a shrinking percentage of less than 15 percent in the drawn axial direction.

7. The method of claim 1 in which the undeveloped polypropylene has a thickness in the range of 10 to 150 microns.

8. The method of Claim 1 in which the drawn films are obtained by heat treating polypropylene film having heat-shrinking percentages greater than the stated ranges.

9. A diapositive image bearing polypropylene film, said image being substantially free of perforations and composed of fine surface undulations, made by the process of claim 1.

10. A method of making a positive projection transparency which comprises the steps of placing a polypropylene film uncoated with any infrared-absorbing materials thereon onto the image-bearing surface of an original carrying an image to be reproduced so as to establish substantial surface-to-surface direct contact between said image-bearing surface and one surface of said film, exposing the resulting assembly of the original and the film, in the absence of a penetrant to infrared light directed through the other surface of the polypropylene film until there is formed on said one surface of the polypropylene film image areas of low light transmittancy corresponding to said image on the original and the remainder of the film has a high light transmittancy, said image areas consisting solely of fine undulations of said one surface layer of the polypropylene film.

11. A method according to claim 10, wherein said polypropylene film has a transparency corresponding to at least 60 percent of parallel luminous transmittancy to visible light rays in a film having a thickness of 50 μ and a heat-shrinking coefficient less than 15 percent in both of biaxial directions on heating at 120° C. for 1 minute.

12. A method according to claim 10, wherein said infrared rays used for the exposure are ones obtained from an infrared lamp whose color temperature is approximately 2,800° K.

* * * * *

UNITED STATES PATENT OFFICE
CERTIFICATE OF CORRECTION

Patent No. 3 675 013　　　　　　　　　　Dated July 4, 1972

Inventor(s) Keishi Kubo, Kiyoshi Sakai

It is certified that error appears in the above-identified patent and that said Letters Patent are hereby corrected as shown below:

Column 1; add --- Claims priority of Japanese Applications,

Serial No. 60856/1967, filed September 23, 1967;

Serial No. 70248/1967, filed November 2, 1967;

Serial No. 72520/1967, filed November 11, 1967;

Serial No. 16511/1968, filed March 15, 1968-

Signed and sealed this 9th day of January 1973.

(SEAL)
Attest:

EDWARD M. FLETCHER, JR.　　　　　　　　ROBERT GOTTSCHALK
Attesting Officer　　　　　　　　　　　　Commissioner of Patents